United States Patent
Garcia Sanchez et al.

(10) Patent No.: US 10,800,305 B2
(45) Date of Patent: Oct. 13, 2020

(54) VEHICLE SEATING ASSEMBLY

(71) Applicant: Ford Global Technologies, LLC, Dearborn, MI (US)

(72) Inventors: Antonio Garcia Sanchez, Joyas de Cuautitlan (MX); Paul Pagnoulle De la Rosa, Hidalgo (MX); Mauricio Aguilar Amoros, Metepec (MX); Jose Raymundo Hernandez Rubio, Mexico City (MX); Luis Enrique Flores Alegria, Naucalpan de Juarez (MX)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 16/102,911

(22) Filed: Aug. 14, 2018

(65) Prior Publication Data
US 2020/0055436 A1    Feb. 20, 2020

(51) Int. Cl.
*B60N 2/00* (2006.01)
*B60N 2/90* (2018.01)
*B60Q 3/20* (2017.01)
*B60J 1/20* (2006.01)
*B60N 3/00* (2006.01)

(52) U.S. Cl.
CPC ............ *B60N 2/91* (2018.02); *B60Q 3/20* (2017.02); *B60J 1/2011* (2013.01); *B60N 2/002* (2013.01); *B60N 3/002* (2013.01); *B60N 2205/35* (2013.01)

(58) Field of Classification Search
CPC ................................. B60N 2/91; B60Q 3/20
USPC ...................... 296/24.46; 297/411.3, 464
See application file for complete search history.

(56) References Cited

U.S. PATENT DOCUMENTS

| | | | |
|---|---|---|---|
| 6,438,899 B1 * | 8/2002 | Feder | ............ B60J 5/0416 296/146.7 |
| 6,644,736 B2 | 11/2003 | Nguyen et al. | |
| 8,720,991 B2 * | 5/2014 | Macleod | ............ B60R 21/026 224/275 |
| 9,956,898 B1 | 5/2018 | Dellock et al. | |
| 2005/0194827 A1 | 9/2005 | Dowty et al. | |
| 2009/0268164 A1 | 10/2009 | Bowden et al. | |
| 2011/0297339 A1 | 12/2011 | Yi et al. | |

* cited by examiner

*Primary Examiner* — Joseph D. Pape
(74) *Attorney, Agent, or Firm* — David Coppiellie; Price Heneveld LLP (57) ABSTRACT

A seating assembly is provided herein that includes a console disposed between laterally adjacent first and second seats. A panel is disposed within the console and movable between a stowed position and a deployed position. A first portion of the panel has a greater transparency than a second portion of the panel. A tray is supported by the console and movable between a first position and a second position. The tray is supported by a support member extending from the console.

18 Claims, 4 Drawing Sheets

VEHICLE SEATING ASSEMBLY

FIELD OF THE INVENTION

The present disclosure generally relates to interior vehicle panels and, more particularly, to interior vehicle panels that may provide privacy to adjacently positioned passengers.

BACKGROUND OF THE INVENTION

More than one passenger may occupy a rear seat of a vehicle. For some vehicles, it may be desirable to have a separating panel between the occupants.

SUMMARY OF THE INVENTION

According to some aspects of the present disclosure, a seating assembly is provided herein. The seating assembly includes a console disposed between laterally adjacent first and second seats. A panel is disposed within the console and movable between a stowed position and a deployed position. A first portion of the panel has a greater transparency than a second portion of the panel.

According to some aspects of the present disclosure, a seating assembly is provided herein. The seating assembly includes a console disposed between laterally adjacent first and second seats. A panel is disposed within the console and movable between a stowed position and a deployed position. A first portion of the panel has a greater transparency than a second portion of the panel. A tray is supported by the console and movable between first and second positions, the tray supported by a support member extending from the console.

According to some aspects of the present disclosure, a seating assembly is provided herein. The seating assembly includes a console disposed between laterally adjacent first and second seats. A panel is disposed within the console and movable between a stowed position and a deployed position. An upper portion of the panel has a greater transparency than a lower portion of the panel. A light source is disposed vertically below the upper portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
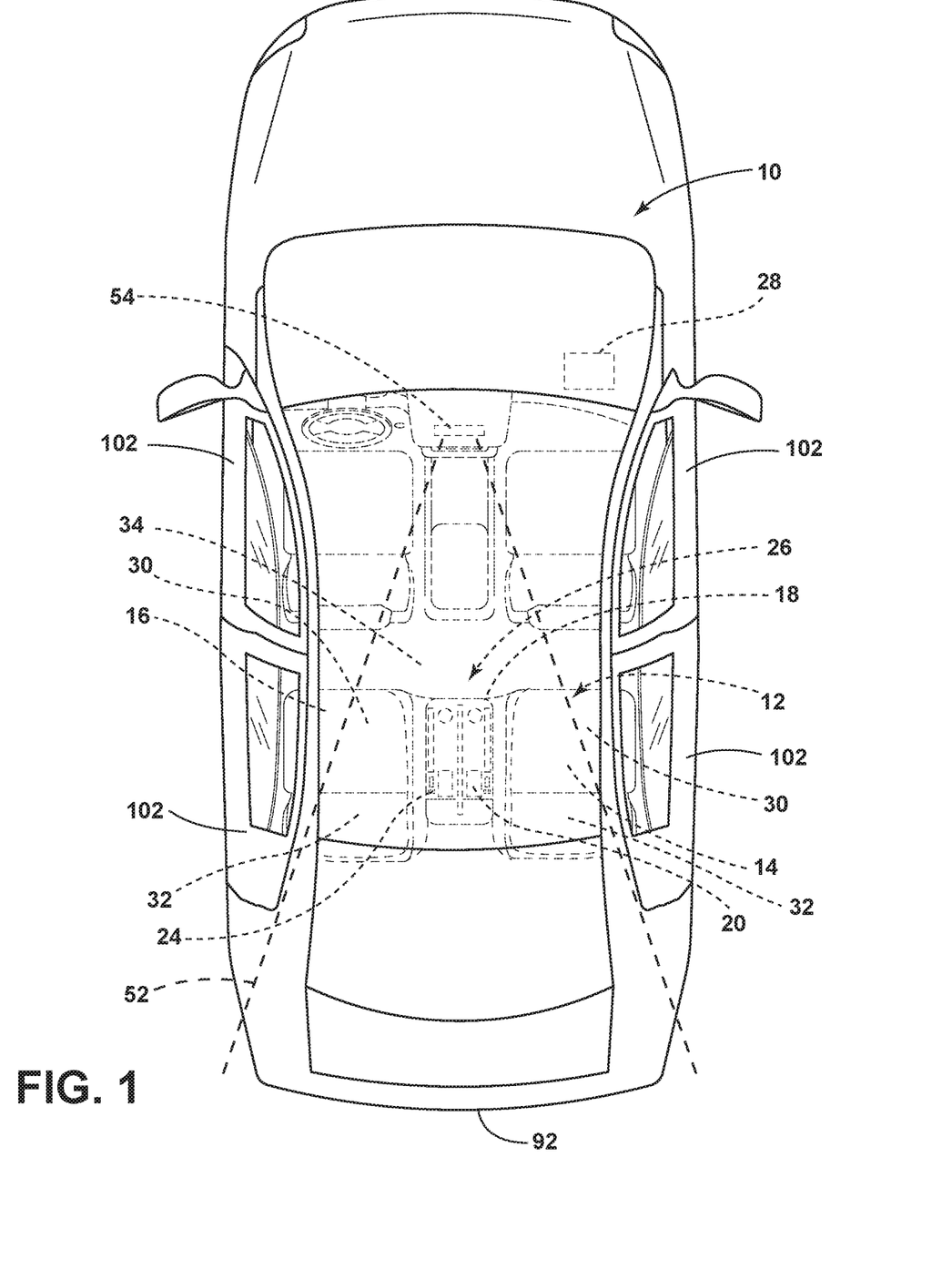
FIG. 1 is a top view of a vehicle having a rear seating assembly therein.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a console for a seating assembly. The seating assembly may be disposed within a vehicle cabin. The seating assembly includes a console disposed between laterally adjacent first and second seats. A panel may be disposed within the console and is movable between a stowed position and a deployed position. A first portion of the panel may have a greater transparency than a second portion of the panel. A tray may be supported by the console and movable between a first position and a second position. The tray is supported by a support member.

Figure 2:
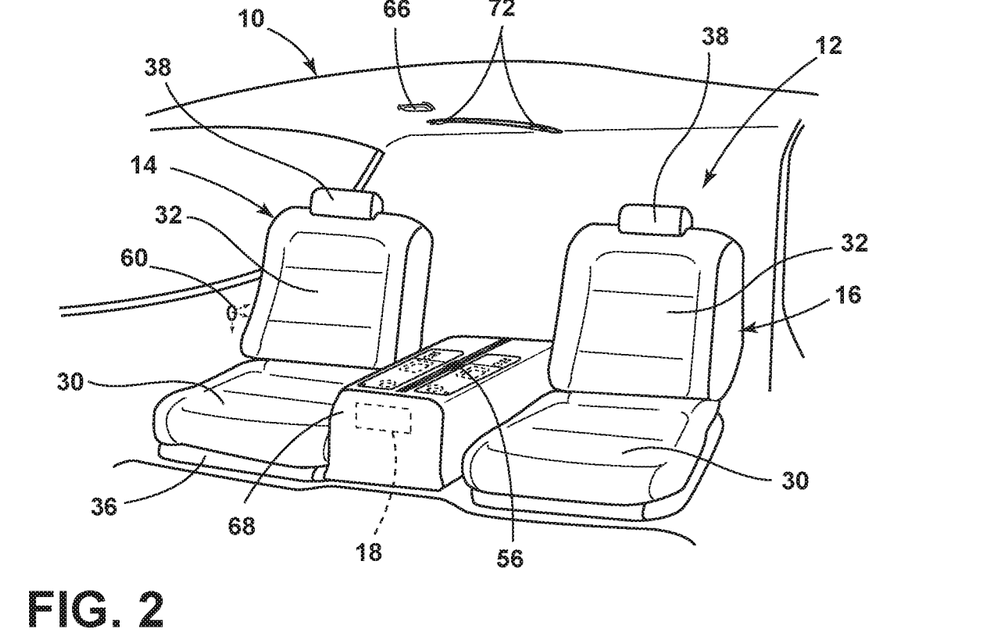
FIG. 2 is a front side perspective view of the seating assembly incorporating a console between a pair of seats, the console having a panel disposed in a stowed position, according to some examples.
Figure 3:
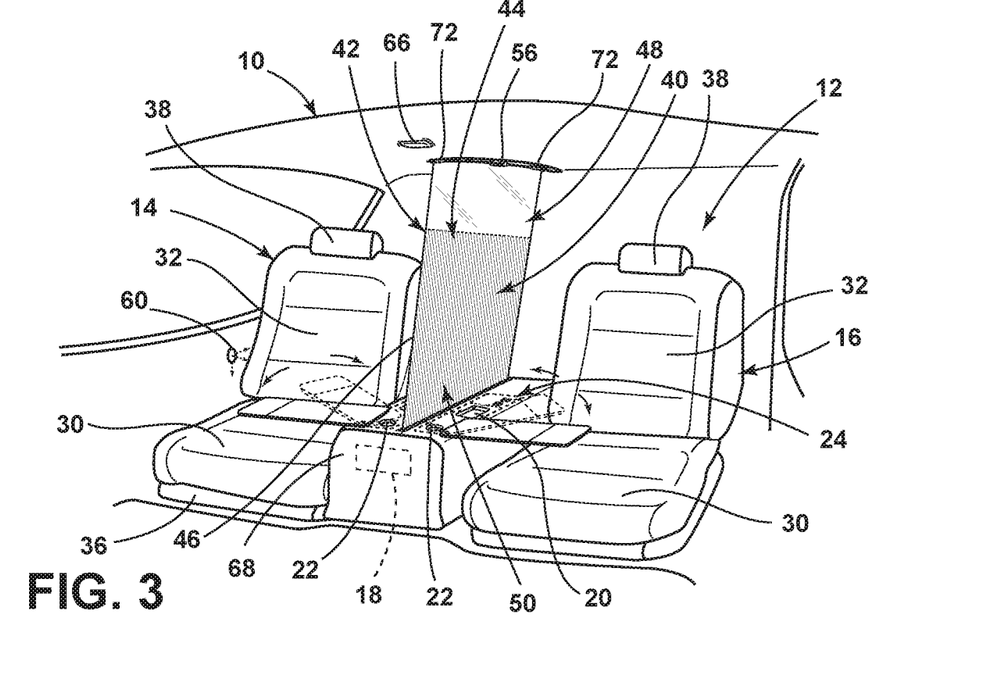
FIG. 3 is a side perspective view of the seating assembly having the panel disposed in a deployed position, according to some examples.

Referring to FIGS. 1-3, a vehicle 10 has a seating assembly 12 that includes two adjacently positioned seats 14, 16 that may have a structure, such as a passenger console 18, disposed between the two seats 14, 16. The passenger console 18 can include various storage compartments 20, cup holders 22, a power source connector or port 24 for powering an electronic device, an audio jack, and/or any other passenger feature. The seating assembly 12 may be disposed within a vehicle cabin 26 and may form a rear seating assembly of the vehicle cabin 26. The seating assembly 12 provided herein may be additionally and/or alternatively disposed in any other practicable location within the passenger vehicle 10 or any other type of vehicle 10, without departing from the scope of the present disclosure. For example, in some instances, the seating assembly 12 may be configured as a front row seating assembly.

With further reference to FIGS. 1-3, the vehicle 10 may be a manually operated vehicle (i.e. using a human driver) or may be autonomously driven by an onboard computer 28. Additionally, or alternatively, the vehicle 10 may be remotely controlled (e.g., via an operator located in a different location). Moreover, the vehicle 10 may be utilized for personal and/or commercial purposes, such as for ride-providing (chauffeuring) services and/or ride-sharing services.

Referring still to FIGS. 1-3, each seat 14, 16 includes a seat bottom 30 coupled with a seatback 32. The seat bottom 30 may be slidably coupled with a floor 34 of the vehicle 10 and/or a seat carrier 36 about a track assembly. The track assembly is configured to allow the vehicle seating assembly 12 to be adjusted in a forward and a rearward direction relative to the vehicle 10. It is understood that the seat 14, 16 may not include the track assembly and may be otherwise movably attached to the vehicle 10, or alternatively, may be fixedly coupled with the floor 34 and/or the seat carrier 36 of the vehicle 10.

The seatback 32 of the seating assembly 12 may be coupled to a body portion of the vehicle 10 and extend upward from the seat bottom 30. The seat bottom 30 and seatback 32 also include a cushion and an upholstery material disposed over the cushion substantially enclosing the seat bottom 30 and seatback 32, respectively. A headrest 38 may be removably and/or adjustably coupled with the upper portion of the seatback 32 and may be substantially centered thereon.

With further reference to FIGS. 1-3, the console 18 may be disposed between the two seats 14, 16 of the seating assembly 12. The console 18 includes a panel 40 that is movable between a stowed position in which the panel 40 is disposed within the console 18, as illustrated in FIG. 2, and/or otherwise removed from separating passengers disposed within the two seats 14, 16 and a deployed position, as illustrated in FIG. 3, in which the console 18 separates the two vehicle seats 14, 16 providing privacy to an occupant disposed laterally adjacent to one side of the panel 40. The panel 40 may include two opposing side surfaces 42, 44 that may face opposing lateral sides of the vehicle 10. A forward surface 46 of the panel 40 may define a thickness of the panel 40. The panel 40 may be configured as a single component and/or a plurality of materials that are attached to one another. According to various examples, the panel 40 may have two portions 48, 50 having varied transparencies. For example, a first or upper portion 48 of the panel 40 may be transparent or translucent and a second or lower portion 50 may be opaque or translucent. Accordingly, when the panel 40 is disposed in the deployed position, the panel 40 may provide privacy to the laterally disposed passengers while minimizing obstructions to a field of view 52 of an operator of the vehicle 10 through usage of a rearview mirror 54.

A handle 56 may be coupled, or integrally formed with, the panel 40. The handle 56 may be used to move the panel 40 between the stowed and deployed positions. Additionally, and/or alternatively, a switch 58 (FIG. 5) may be disposed on the panel 40 and/or within the vehicle cabin 26 and operably coupled with an electronically driven assembly that moves the panel 40 between the stowed and deployed positions. The panel 40 may be lowered and/or raised automatically, and the movement of the panel 40 may be in accordance with a motor within the electronically driven assembly and operably connected to the panel 40.

Referring to FIGS. 2 and 3, a light source 60 may be disposed proximate to one or both of the seats 14, 16. The light sources 60 are operably coupled with a controller 62 (FIG. 6) and a power source 64 (FIG. 6), which includes a conventional vehicle power source or an independent power source. The controller 62 may include control circuitry that includes LED drive circuitry for controlling activation and deactivation of the light sources 60. The light sources 60 may include any form of light sources. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the seating assembly 12. Further, various types of LEDs are suitable for use as the light sources 60 including, but not limited to, top-emitting LEDs, side-emitting LEDs, and others. Moreover, according to various examples, multicolored light sources 60, such as Red, Green, and Blue (RGB) LEDs that employ red, green, and blue LED packaging may be used to generate various desired colors of light outputs from a single light source 60, according to known light color mixing techniques.

In some examples, the light source 60 may be positioned vertically below the first or upper portion 48 of the panel 40. In some instances, the lower height of the light source 60 may prevent a direct line of sight of emitted light from the light source 60 to an opposing side of the panel 40, which may minimize the distraction of the emitted light to a passenger on the opposing side of the panel 40 when the panel 40 is deployed. In some examples, a dome light 66 may be disposed on the headliner that does have a direct line of sight to both seats 14, 16, which may be used in cases where both seats 14, 16 may be illuminated, such as during emergency situations.

In some examples, the light source 60 may be controlled by the switch 58 that is capable of accepting inputs (e.g., capable of being activated) In some instances, the switch 58 may be configured as a proximity switch. The proximity switch provides a sense activation field for sensing contact or close proximity (e.g., within one millimeter) of an object, such as the hand (e.g., palm or finger(s)) of an operator in relation to the proximity switch. The proximity switch may also detect a swiping motion by the hand of the operator such as a swipe of the thumb or another finger. It will be appreciated by those skilled in the art that additional or alternative types of proximity switches can be used, such as, but not limited to, capacitive sensors, inductive sensors, optical sensors, temperature sensors, resistive sensors, the like, or a combination thereof. Exemplary proximity switches are described in the Apr. 9, 2009, ATMEL® Touch Sensors Design Guide, 10620 D-AT42-04/09, the entire reference is incorporated herein by reference. It will be appreciated that the switch 58 may alternatively be a mechanical switch of any type known in the art, such as a push button. In push button examples, a membrane may be provided as a seal over the switch 58. Depression of the membrane causes depression of a plunger on the switch 58. Internal switch contacts then change positions to provide an output signal.

Referring to FIGS. 2-5, the console 18 includes a housing 68 and the panel 40 extends to a deployed position (FIG. 3) from the housing 68 and retracts into a stowed position (FIG. 2) at least partially within the housing 68 through a slot 110 defined by the housing 68. According to some examples, the panel 40 may include an engaging member 70 that is configured to couple with a retaining member 72 disposed within the vehicle 10 to maintain the panel 40 in the deployed position. In some instances, the retaining member may be operably coupled with a headliner or a roof structure of the vehicle 10. According to some examples, the retaining member 72 may be a latch, a loop or other mechanical retaining device configured to couple with the engaging member 70.

Referring to FIGS. 2-5, the housing 68 may include one or more retraction systems for holding, retracting, and deploying the panel 40 from the housing 68. The retraction system may include a roller 74, which is positioned within the housing 68. The roller 74 may be torsionally biased by a spring or the like to generate tension acting on the panel 40. The tension generated by the roller 74 on the panel 40 may keep the panel 40 taut while in the deployed and/or stowed positions.

With further reference to FIGS. 2-5, the panel 40 may be wound around the roller 74, and as such, each component of the panel 40 may be flexible. As such, the panel 40 may be composed of a fabric material, a plastic material, an elastomeric material, a metallic material, combinations thereof, and/or any other practicable material. In some examples, the panel 40 may be flexible and/or pliable. The panel 40 may have a mesh structure (e.g., fine or coarse) of strands, fibers, a film structure, or a sheet structure. The panel 40 may have a sufficiently fine structure to block light in various portions 48, 50 thereof. In film or sheet examples, the second or lower portion 50 of the panel 40 may be tinted or otherwise darkened to absorb light. In yet other examples, the second or lower portion 50 of the panel 40 may be formed from a partially or fully vacuum metalized sheet configured to reflect light.

Figure 4:
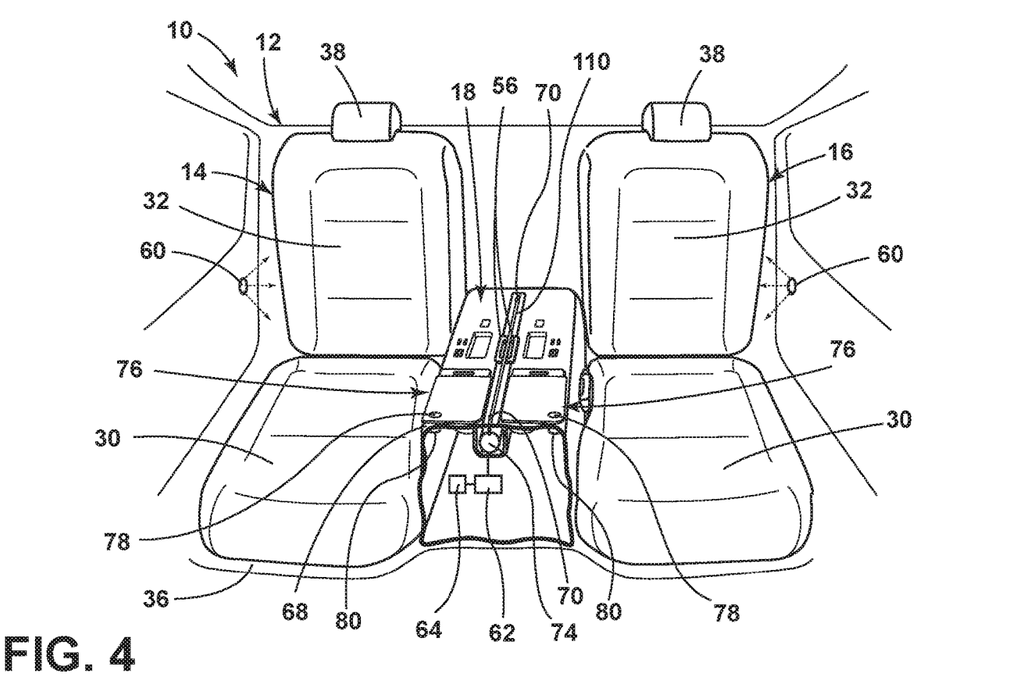
FIG. 4 is a side perspective view of the seating assembly and the console having a pair of trays in a retracted and first position, according to some examples.
Figure 5:
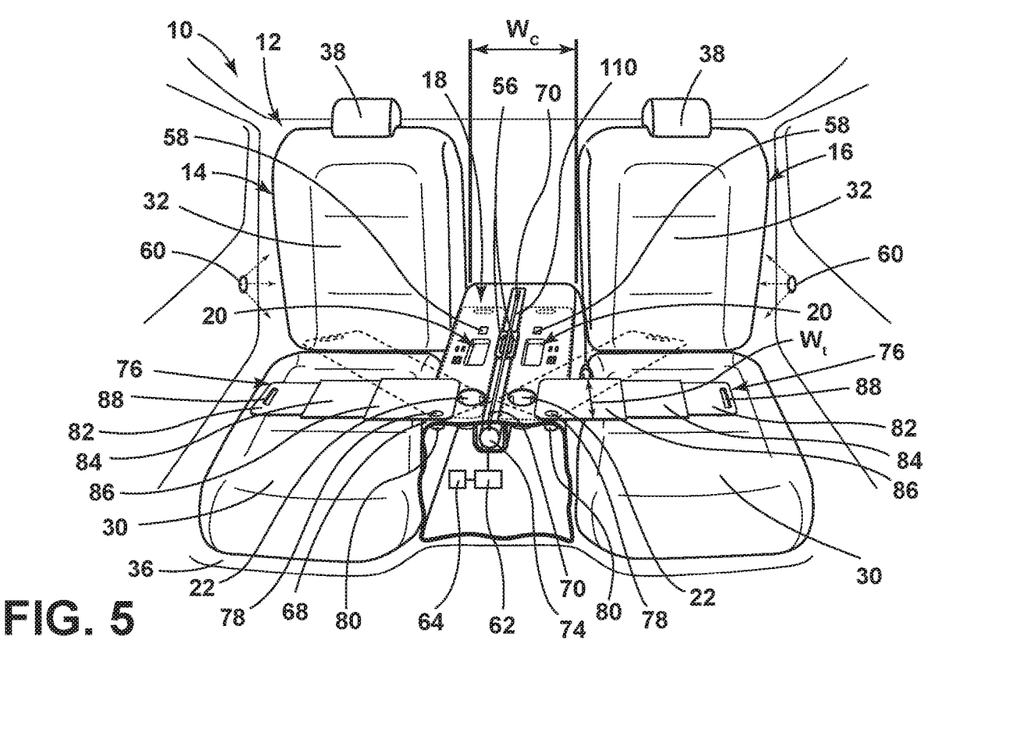
FIG. 5 is a side perspective view of the seating assembly and the console having a pair of trays in an expanded and second position, according to some examples.

With reference to FIGS. 4 and 5, the console 18 may additionally include one or more rotatable trays 76 that may be moved from a first position over the console 18, as exemplarily illustrated in FIG. 4, to a second position wherein a larger portion of the tray 76 is disposed over the seat 14, 16, as exemplarily illustrated in FIG. 5. When the tray 76 is disposed in the first position, the tray 76 may be disposed over one or more of the features (e.g., 20, 22, 24) of the console 18, such as the electronic ports 24, the storage compartment 20, and/or the cup holder 22. However, it will be appreciated that the tray 76 may be disposed in a first position in which the any and/or all of the features (e.g., 20, 22, 24) of the console 18 remain accessible. The tray 76 may have a width Wt that is less than half of the width $w_c$ of the console 18 such that both trays 76 may be disposed in their respective first positions and the panel 40 may still be deployed from the housing 68.

In some instances, the tray 76 may be pivoted between the first and second position about a support member 78. The support member 78 may be fixed to a section 82, 84, 86 of the tray 76 and include an anchor 80 operably coupled with the housing 68 and/or any other portion of the vehicle 10 about which the support member 78 rotates. Additionally, the support member 78 may be vertically adjustable relative to the anchor 80. In some examples, the tray 76 may also expand and retract. Accordingly, the tray 76 may include one or more sections 82, 84, 86 of varying width such that each thinner section 82, 84, 86 may be disposed within an adjacent thicker section 82, 84, 86. In some instances, the section 82 of the tray 76 furthest from the support member 78 may include or define a handle 88 thereon for pulling the plurality of sections 82, 84, 86 out of one another. The support member 78 may be manually and/or electronically adjustable. In instances in which the tray 76 is electronically adjustable, the tray 76 may return to the first position when the vehicle 10 determines that the seat 14, 16 proximate the tray 76 is unoccupied.

As provided herein, the light source 60 may be disposed vertically below the first or upper portion 48 of the panel 40 when the panel 40 is in the deployed position. The light source 60 may also be disposed above the height (and possibly the maximum functional height) of the tray 76 such that emitted light from the light source 60 may illuminate a top portion of the tray 76.

Figure 6:
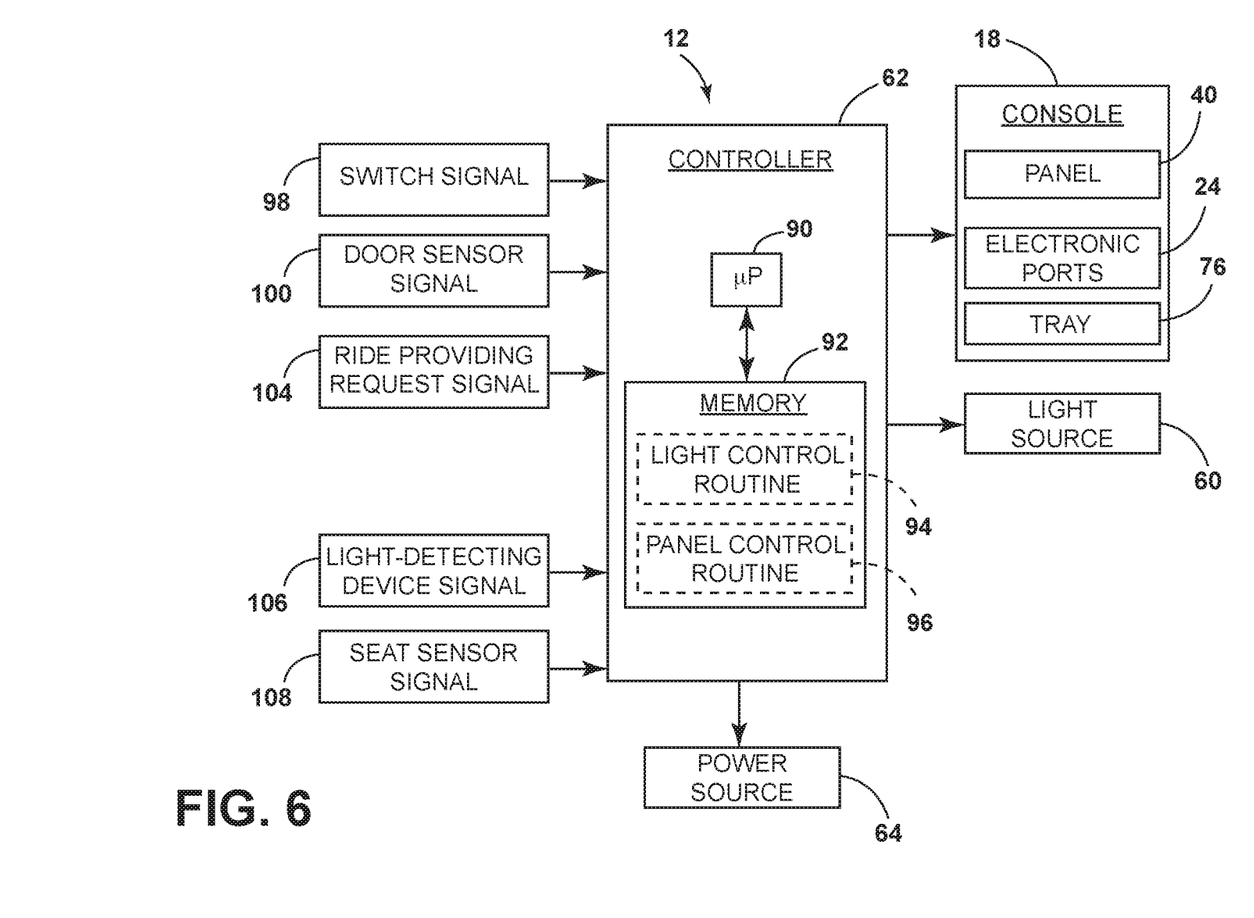
FIG. 6 is a block diagram of various inputs for a controller that controls one or more features of the seating assembly, according to some examples.

With reference to FIG. 6, the controller 62 includes control circuitry in the form of a microprocessor 90 and memory 92. A light control routine 94 and a panel control routine 96 are shown stored in memory 92 and executable by the microprocessor 90. The microprocessor 90 or other control circuitry processes the various inputs. The inputs to the controller 62 may include a switch signal 98. The switch signal 98 may activate or deactivate the light sources 60 based on the toggling of a switch 58 within the vehicle 10 by an occupant. The switch 58 may be disposed on any portion of the console 18. Additionally, and/or alternatively, the switch 58 may be disposed within any other practicable location of the vehicle cabin 26.

The inputs to controller 62 may also include a door state signal 100. A door sensor may be configured to determine whether a door 102 (FIG. 1) has been opened and/or closed. In some instances, the door sensor may include a switch or proximity sensor such as a Hall-effect sensor. The door sensor may be configured to output a door state signal 100. When the door 102 is closed, the door state signal 100 may indicate a closed state (i.e., the door 102 is closed). When the door 102 is open, the door state signal 100 may indicate an open state (i.e., the door 102 is open). The vehicle 10 may include any number of door sensors. At least one door sensor may be disposed on each door 102.

The controller 62 may also accept a ride-providing signal 104 indicative of an occupant entering the vehicle 10 and/or the end of a trip for a ride providing service. Accordingly, the tray 76 may rotate to the first position and/or the light source 60 may illuminate in conjunction with the entering and/or exiting of an occupant.

With further reference to FIG. 6, the controller 62 may accept a signal 106 from a light-detecting device of the vehicle 10. The light-detecting device senses the environmental lighting conditions, such as whether the vehicle 10 is in day-like conditions (i.e., higher light level conditions) and/or whether the vehicle 10 is in night-like conditions (i.e., lower light level conditions). The light-detecting device can be of any suitable type and can detect the day-like and night-like conditions in any suitable fashion. For instance, in some examples, the light-detecting device includes a light sensor that detects the amount of light (e.g., solar radiation) affecting the vehicle 10 for determining whether day-like or night-like conditions exist. According to some examples, the colors of light and/or intensities of light emitted from the light sources 60 may be varied based on the sensed conditions.

The controller 62 may also accept a signal 108 from a seat sensor. The seat sensor, which includes, but is not limited to, any type of proximity sensor, seat airbag sensor, pressure sensor, etc., may be utilized for activating the light source 60, moving the panel 40 between the first and second positions, activating the electronic ports, and/or moving the tray 76 between the first and second positions. For example, the tray 76 may be returned to the first position when the seating assembly 12 is vacant.

Accordingly, the console provided herein may advantageously provide additional features and/or privacy for passengers of the vehicle. When the panel is disposed in the deployed position, adjacent passengers may have privacy from one another. Moreover, a tray may be rotated from the console to a position over each seat. The console assembly may also include any number of additional features that may be utilized by the passenger of the vehicle when the panel is in the deployed or stowed position. Additionally, the panel may reduce the distraction of light emitted by a light source on an opposing side of the panel. Lastly, the top portion of the panel may be more transparent than a bottom portion of the panel to minimize the obstruction of the panel to the field of view of an operator of the vehicle when the operator uses a rear mirror of the vehicle. All of these features may be incorporated into the seating assembly while minimizing the cost of production when compared to seating assemblies currently available.

According to various examples, a seating assembly is provided herein. The seating assembly includes a console disposed between laterally adjacent first and second seats. A panel is disposed within the console and movable between a stowed position and a deployed position. A first portion of the panel has a greater transparency than a second portion of the panel. Examples of the seating assembly can include any one or a combination of the following features:
  the first portion is disposed vertically above the second portion;
  the first portion of the panel is translucent and is disposed within a field of view of an operator of a vehicle;
  a tray supported by the console and movable between a first position and a second position, the tray supported by a support member;
  the support member is rotatable relative an anchor that is operably coupled to the console;
  a light source is proximate the seating assembly and disposed at a vertical height that is less than the height of the second portion of the panel relative to a seat bottom;
  the console further includes one or more features that are accessible when the tray is in the second position and inaccessible when the tray is in the first position;
  a retention feature on a headliner of a vehicle configured to couple with the panel and maintain the panel in the deployed position;
  a handle operably coupled to the panel and extending a width outwardly that is greater than a width of a slot defined by the console through which the panel extends;
  the tray is rotated to the first position when a seat is unoccupied as detected by a seat sensor; and/or
  a switch disposed on the console and configured to activate and deactivate the light source.

According to some examples, a method of manufacturing a seating assembly is provided herein. The method includes positioning a console between laterally adjacent first and second seats. The method also includes anchoring a panel within the console, the panel movable between a stowed position and a deployed position. A first portion of the panel has a greater transparency than a second portion of the panel.

According to some examples, a seating assembly is provided herein. The seating assembly includes a console disposed between laterally adjacent first and second seats. A panel is disposed within the console and movable between a stowed position and a deployed position. A first portion of the panel has a greater transparency than a second portion of the panel. A tray is supported by the console and movable between first and second positions, the tray supported by a support member extending from the console. Examples of the seating assembly can include any one or a combination of the following features:
  the support member is rotatable relative an anchor that is operably coupled to the console;
  the first portion is disposed vertically above the second portion; and/or
  the first portion of the panel is translucent and is disposed within a field of view of an operator of a vehicle.

According to some examples, a seating assembly is provided herein. The seating assembly includes a console disposed between laterally adjacent first and second seats. A panel is disposed within the console and movable between a stowed position and a deployed position. An upper portion of the panel has a greater transparency than a lower portion of the panel. A light source is disposed vertically below the upper portion. Examples of the seating assembly can include any one or a combination of the following features:
  emitted light from the light source is blocked from a direct line of sight across the first and second seats by the lower portion of the panel when the panel is in the deployed position;
  the lower portion of the panel is opaque;
  a handle operably coupled to the panel and extending a width outwardly that is greater than a width of a slot defined by the console through which the panel extends; and/or
  a retention feature on a headliner of a vehicle configured to couple with the panel and maintain the panel in the deployed position.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seating assembly comprising:
   a console disposed between laterally adjacent first and second seats; and
   a panel disposed within the console and movable between a stowed position and a deployed position, wherein a first portion of the panel has a greater transparency than a second portion of the panel, wherein a light source is proximate the seating assembly and disposed at a vertical height that is less than the height of the second portion of the panel relative to a seat bottom, and a switch disposed on the console and configured to activate and deactivate the light source.

2. The seating assembly of claim 1, wherein the first portion is disposed vertically above the second portion.

3. The seating assembly of claim 1, wherein the first portion of the panel is translucent and is disposed within a field of view of an operator of a vehicle.

4. The seating assembly of claim 1, further comprising:
   a tray supported by the console and movable between a first position and a second position, the tray supported by a support member.

5. The seating assembly of claim 4, wherein the support member is rotatable relative to an anchor that is operably coupled to the console.

6. The seating assembly of claim 4, wherein the console further includes one or more features that are accessible when the tray is in the second position and inaccessible when the tray is in the first position.

7. The seating assembly of claim 6, further comprising:
   a retention feature on a headliner of a vehicle configured to couple with the panel and maintain the panel in the deployed position.

8. The seating assembly of claim 1, further comprising:
   a handle operably coupled to the panel and extending a width outwardly that is greater than a width of a slot defined by the console through which the panel extends.

9. The seating assembly of claim 4, wherein the tray is rotated to the first position when a seat is unoccupied as detected by a seat sensor.

10. A seating assembly comprising:
    a console disposed between laterally adjacent first and second seats;
    a panel disposed within the console and movable between a stowed position and a deployed position, wherein a first portion of the panel has a greater transparency than a second portion of the panel; and
    a tray supported by the console and movable between first and second positions, the tray supported by a support member extending from the console, wherein the tray is rotated to the first position when a seat is unoccupied as detected by a seat sensor.

11. The seating assembly of claim 10, wherein the support member is rotatable relative to an anchor that is operably coupled to the console.

12. The seating assembly of claim 10, wherein the first portion is disposed vertically above the second portion.

13. The seating assembly of claim 10, wherein the first portion of the panel is translucent and is disposed within a field of view of an operator of a vehicle.

14. A seating assembly comprising:
    a console disposed between laterally adjacent first and second seats;
    a panel disposed within the console and movable between a stowed position and a deployed position, wherein an upper portion of the panel has a greater transparency than a lower portion of the panel;
    a light source disposed vertically below the upper portion; and
    a switch disposed on the console and configured to activate and deactivate the light source.

15. The seating assembly of claim 14, wherein emitted light from the light source is blocked from a direct line of sight across the first and second seats by the lower portion of the panel when the panel is in the deployed position.

16. The seating assembly of claim 14, wherein the lower portion of the panel is opaque.

17. The seating assembly of claim 14, further comprising:
a handle operably coupled to the panel and extending a width outwardly that is greater than a width of a slot defined by the console through which the panel extends.

18. The seating assembly of claim 14, further comprising:
a retention feature on a headliner of a vehicle configured to couple with the panel and maintain the panel in the deployed position.

\* \* \* \* \*